United States Patent

Buysch et al.

[11] Patent Number: 5,270,385
[45] Date of Patent: Dec. 14, 1993

[54] ANTISTATIC, THERMOPLASTIC MOULDING COMPOUNDS BASED ON AROMATIC POLYCARBONATES AND AROMATIC VINYL POLYMERS

[75] Inventors: Hans-Josef Buysch; Norbert Schön, both of Krefeld; Herbert Eichenauer, Dormagen, all of Fed. Rep. of Germany; Hans-Jürgen Kress, Pittsburgh, Pa.; Josef Buekers, Krefeld, Fed. Rep. of Germany

[73] Assignee: Bayer Aktiengesellschaft, Leverkusen, Fed. Rep. of Germany

[21] Appl. No.: 535,184

[22] Filed: Jun. 8, 1992

Related U.S. Application Data

[63] Continuation of Ser. No. 150,920, Feb. 1, 1988, abandoned.

[30] Foreign Application Priority Data

Feb. 13, 1987 [DE] Fed. Rep. of Germany ....... 3704487

[51] Int. Cl.$^5$ ............... C08G 63/48; C08G 63/91; C08L 51/00
[52] U.S. Cl. ............... 525/64; 525/67
[58] Field of Search ............... 525/64, 67

[56] References Cited

U.S. PATENT DOCUMENTS

| | | | |
|---|---|---|---|
| 3,110,695 | 11/1963 | Ceresa | 525/418 |
| 4,435,541 | 3/1984 | Brandstetter et al. | 525/64 |
| 4,683,265 | 7/1987 | Kress et al. | 525/69 |
| 4,719,263 | 1/1988 | Barnhouse et al. | 525/403 |
| 4,839,421 | 6/1989 | Buysch et al. | 525/64 |
| 4,895,898 | 1/1990 | Kress et al. | 525/67 |

FOREIGN PATENT DOCUMENTS 1394481 5/1975 United Kingdom .

Primary Examiner—Susan Berman
Attorney, Agent, or Firm—Connolly & Hutz

[57] ABSTRACT

Thermoplastic moulding compounds of 99.8–95% by weight of a mixture consisting of an aromatic polycarbonate, a graft polymer and optionally a thermoplastic vinyl polymer and/or the usual additives and 0.2 to 5% by weight of a polyalkylene ether which has been grafted with a polymer of $C_1$–$C_6$ alkyl(meth)acrylates, cyclo-alkylacrylates or -methacrylates and optionally styrene or α-methylstyrene.

2 Claims, No Drawings

ANTISTATIC, THERMOPLASTIC MOULDING COMPOUNDS BASED ON AROMATIC POLYCARBONATES AND AROMATIC VINYL POLYMERS

This is a continuation of application Ser. No. 150,920 filed Feb. 1, 1988, abandoned.

This invention relates to antistatic, thermoplastic moulding compounds consisting of a thermoplastic aromatic polycarbonate resin, a graft polymer and optionally a thermoplastic vinyl polymer based on aromatic vinyl compounds and other vinyl monomers, which moulding compounds contain, as antistatic agent, a polyalkylene ether which has been modified with polymers of (meth)acrylate and/or optionally other vinyl monomers.

Most synthetic materials are electric insulators with a high electrical surface resistance owing to their chemical constitution. The surfaces of synthetic materials therefore readily become electrostatically charged when being processed and in use. This leads to numerous problems in practice, e.g. the synthetic material parts rapidly accumulate dirt and dust, with the formation of characteristic dust figures on the surface. This applies particularly to polymers of aromatic vinyl compounds and acrylonitrile, optionally modified with rubber, used as moulding compounds, e.g. styrene-arylonitrile copolymers (SAN) and graft polymers of styrene and acrylonitrile on polybutydiene (ABS).

The antistatic finishing of such moulding compounds is known. Compounds which have been recommended as antistic agents include, for example, alkyl and arylsulphonates (DE-OS 2 44 652), amines (DE-PS 1 258 083), quaternary ammonium salts, amides, phosphoric acids and alkyl and arylphosphonates.

The usual antistatic agents for aromatic vinyl polymers cannot be used in mixtures of these vinyl polymers and aromatic polycarbonates since they either cause degradation of the aromatic polycarbonate or are too ineffective.

It has been found that antistatic agents which are highly effective for mixtures of aromatic polycarbonates and aromatic vinyl polymers and do not impair the mechanical properties, surface properties, eolour or thermostability of the mixtures of aromatic polycarbonates and aromatic vinyl polymers may be obtained by grafting polyalkylene ethers with $C_1$–$C_6$-alkyl(meth)acrylates, cyclo-alkylacrylates or -methacrylates and optionally, in addition, styrene or α-methylstyrene.

The present invention thus relates to antistatic, thermoplastic moulding compounds composed of
I. 99.8–95% by weight, preferably 99–97% by weight, of a mixture consisting of an aromatic polycarbonate, a graft polymer and optionally a thermoplastic vinyl polymer and/or the usual additives and
II 0.2–5.0% by weight, preferably 1.0–3.0% by weight, of a polyalkylene ether which has been grafted with a polymer of $C_1$–$C_6$-alkyl(meth)acrylates, cyclo-alkylacrylates or -methacrylates and optionally, in addition, styrene or α-methylstyrene.

This invention further relates to a process for the antistatic finishing of a mixture of aromatic polycarbonate, a graft polymer and optionally a thermoplastic vinyl polymer and/or the usual additives, characterised in that from 0.2–5.0% by weight, preferably from 1–3% by weight, of a polyalkylene ether which has been grafted with a polymer of $C_1$–$C_6$ alkyl(meth)acrylates, cyclo-alkylacrylates or -methacrylates and optionally, in addition, styrene or α-methylstyrene. are added to such a mixture.

Polymer mixture I in the context of a present invention consists of
A) 95–10% by weight, preferably 90–10% by weight, most preferably 85–25% by weight, of a thermoplastic aromatic polycarbonate or a mixture of several aromatic polycarbonates,
B) 5–90% by weight, preferably 10–90% by weight, most preferably 15–75% by weight, of a mixture of
Ba) 100–0 parts by weight, preferably 100–20 parts by weight, most preferably 100–30 parts by weight of one or more graft polymers and
Bb) 0–100 parts by weight, preferably 0–80 parts by weight, most preferably 0–70 parts by weight, of one or more thermoplastic vinyl copolymers.

Thermoplastic, aromatic polycarbonates A suitable for the purpose of this invention include those based on diphenols corresponding to the following formula (II)

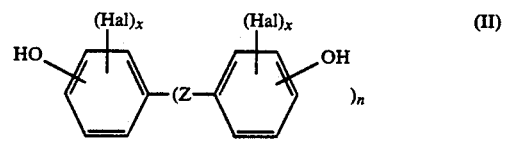

wherein Z denotes a single bond, a $C_1$–$C_5$-alkylene group, a $C_2$–$C_5$-alkylidene group, a $C_5$–$C_6$-cycloalkylidene group, S or $SO_2$; Hal denotes chlorine or bromine, x represents 0, 1 or 2 and n represents 1 or 0, and optionally diphenols corresponding to formula (IIa)

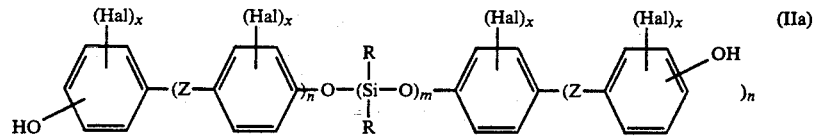

wherein Z, Hal, x and n have the meanings indicated for formula (II) and the groups R may be identical or different and denote straight chained $C_1$–$C_{20}$-alkyl, branched $C_3$–$C_{20}$-alkyl or $C_6$–$C_{20}$-aryl, preferably $CH_3$, and m is an integer of from 5 to 100, preferably from 20 to 80.

Polycarbonates A suitable for the purpose of this invention include homopolycarbonates and copolycarbonates, the diphenols corresponding to formula (IIa) being used only in combination with diphenols of formula (II) for the preparation of copolycarbonates, and their proportion by weight in the copolycarbonates amounting to 1 to 20% by weight, preferably 1.5 to 15% by weight, in particular 2 to 10% by weight, based on the total weight of the diphenols corresponding to formulae (II) and (IIa).

Component A may also consist of mixtures of the thermoplastic polycarbonates defined above if they are mixtures with polydiorganosiloxane-polycarbonate block copolymers in which the ratio by weight of diphenols (IIa) is from 1 to 20% by weight, based on the total sum of diphenols in the polycarbonate mixture.

The polycarbonates A suitable for the present invention are known. They may be prepared, for example, with phosgene by the phase interface process or with phosgene by the homogeneous phase process, the so-called pyridine process, in which the molecular weight may be adjusted in a known manner by means of known chain breaking agents. (For polycarbonates containing polydiorganosiloxanes, see DE-OS 3 334 873).

The following are examples of suitable chain breaking agents: Phenol, p-chlorophenol, p-tert,-butylphenol and 2,4,6-tribromophenol; Long chained alkyl phenols such as 4-(1,3-tetramethylbutyl)-phenol according to DE-OS 2 842 005 and monoalkyl phenols or dialkyl phenols having a total of 8 to 20 carbon atoms in the alkyl substituents according to DE-OS 3 506 472, such as 3,5-di-tert, -butyl phenol, p-iso-octylphenol, p-tert, -octylphenol, p-dodecyl phenol and 2-(3,5-dimethyl-heptyl)phenol and 4-(3,5-dimethyl-heptyl)-phenol. The quantity of chain breaking agent to be used is generally from 0,5 mol % to 10 mol-%, based on the sum of the diphenols (II) and optionally (IIa) put into the process.

Polycarbonates A suitable for the present invention have weight average molecular weights (Mw determined, for example, by ultracentrifugation or scattered light measurement) of from 10,000 to 200,000, preferably from 20,000 to 80,000.

Examples of suitable diphenols corresponding to formula (II) include hydroquinone, resorcinol, 4,4'-dihydroxy-diphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)propane and 2,2-bis-(3,5-dibromo-4-hydroxyphenyl)-propane.

2,2-Bis-(4-hydroxyphenyl)-propane, 2,2-bis-(3,5-dichloro-4-hydroxyphenyl)-propane and 1,1-bis (4-hydroxyphenyl)-cyclohexane are preferred diphenols corresponding to formula (II).

Diphenols of formula (IIa) in which R stands for methyl, ethyl, propyl, n-butyl, tert.-butyl or phenyl are suitable.

Preferred diphenols corresponding to formula (IIa) are those corresponding to the following formula (IIb)

and diphenols (II), for example according to U.S. Pat. No. 3,419,634 in combination with U.S. Pat. No. 3,189,662.

In the bis-chloro compounds (III), R and m have the same meanings as in the diphenols (IIa) and (IIb).

The polycarbonates A used for the purpose of this invention may be branched in a known manner, preferably by the incorporation of from 0.05 to 2.0 mol-%, based on the sum of diphenols, of trifunctional or higher than trifunctional compounds, for example compounds containing three or more than three phenolic groups.

Preferred polycarbonates, apart from bis-phenol A-homopolycarbonate, include copolycarbonates of bis-phenol A containing up to 15 mol-%, based on the molar sums of diphenols of 2,2-bis(3,5-dibromo-4-hydroxyphenyl)-propane or the copolycarbonates of diphenols of formula (II) with from 1 to 20% by weight of diphenols of formula (IIa), preferably formula (IIb), based in each case on the total weight of diphenols (II) and (IIa) or (II) and (IIb).

Suitable graft polymers Ba include those in which styrene, α-methylstyrene, methylmethacrylate or a mixture of 95 to 50% by weight of styrene, α-methylstyrene, nuclear substituted styrene, methylmethacrylate or mixtures thereof and 5 to 50% by weight of acrylonitrile, methacrylonitrile, maleic acid anhydride, N-substituted maleimide, methyl methacrylate or mixtures thereof (graft scion) are graft polymerised on a rubber (graft stock).

Rubbers suitable for the preparation of graft polymers Ba include, in particular, polybutadiene, butadiene/styrene copolymers (both also copolymerised with up to 30% by weight, based on the weight of rubber, of a lower alkyl ester of acrylic or methacrylic acid, such as methyl-methacrylate, ethylacrylate, methylacrylate or ethylmeth-acrylate), polyisoprene, polychloroprene, alkylacrylate rubbers (obtained from $C_1-C_8$-alkylacrylates, in particular ethyl, butyl or ethylhexylacrylate). The alkylacrylate rubbers may contain up to 30% by weight, based on the weight of rubber, of monomers such as vinyl acetate, acrylonitrile, styrene, methylmethacrylate and/or vinyl ethers incorporated by copolymerisation as well as minor quantities, preferably up to 5% by weight based on the weight of rubber, of ethylenically unsaturated monomers which have a cross-linking action, Cross-linking agents of this type

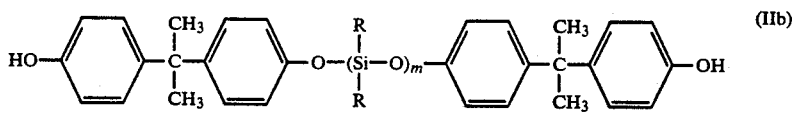

wherein the groups R are identical and have the meanings indicated above, i.e. preferably methyl, etc. or phenyl and m represents an integer with a value from 5 to 100, preferably from 20 to 80.

Diphenols corresponding to formula (IIa) may be prepared from the corresponding bis-chloro compounds (III):

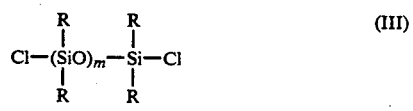

include, for example, alkylenediol-di(meth)acrylates, polyester di(meth)acrylates, divinylbenzene, trivinylbenzene, triallylcyanurate, allyl(meth)acrylate, butadiene or isoprene. Suitable acrylate rubbers also include those which contain a cross-linked diene rubber of one or more conjugated dienes and optionally an ethylenicall unsaturated monomer such as styrene and/or acrylonitrile as nucleus. Other suitable rubbers include, for example EPDM rubbers, which are rubbers of ethylene, propylene and an unconjugated diene.

Diene rubbers and alkylacrylate rubbers are preferred rubbers for the preparation of graft polymers Ba.

Acrylate rubbers are particularly suitable if they have a core-sheath structure, i.e. if they contain a core of a different polymer surrounded by a sheath of cross-linked alkylacrylate rubber.

The rubbers are present in the graft polymer Ba in the form of at least partially cross-linked particles having an average particle size of from 0.05 to 5 μm, in particular from 0.075 to 1 μm and they preferably have gel contents of at least 70% by weight.

The graft polymers Ba are prepared by radical graft polymerisation of the above mentioned monomer mixtures in emulsion, solution, suspension or solvent-free in the presence of these rubbers.

The graft scion of graft product Ba obtained from the above-mentioned polymer mixtures is produced, for example, by polymerisation of the corresponding monomers in the presence of a Latex (emulsion) of the graft stock. This polymerisation may be initiated by radical initiator, e.g. by persulphates, peroxides, percarbonates or peresters but in particular by water-soluble initiators such as persulphates or redox initiator systems. Polymerisation processes of this kind are known. Preferred graft scions are obtained by the graft polymerisation of a monomer mixture of from 50 to 95 parts by weight of styrene, α-methylstyrene, nuclear substituted styrene, methyl methacrylate or mixtures thereof and from 50 to 5 parts by weight of (meth)acrylonitrile, methyl methacrylate, maleic acid anhydride, N-substituted maleimide or mixtures thereof.

Preferred copolymers Bb are copolymers of styrene, α-methylstyrene, nuclear substituted styrene or mixtures thereof with acrylonitrile, methacrylonitrile, methyl methacrylate, maleic acid anhydride, N-substituted maleimide or mixtures thereof.

Thermoplastic copolymers having a composition according to Bb are frequently formed as by-products of the graft polymerisation carried out for the preparation of component Ba, especially when large quantities of monomers are grafted on small quantities of rubber.

The quantity of copolymer Bb to be used according to the invention, amounting to 0 to 80 parts by weight, preferably 0 to 70 parts by weight, based on 100 parts by weight of A+B+Bb, does not include this by-product of graft polymerisation.

The copolymers according to component Bb are resinous, thermoplastic and free from rubber. Copolymers of styrene and/or α-methylstyrene with acrylonitrile and optionally methyl methacrylate are particularly preferred copolymers Bb.

Halogenated styrenes and p-methylstyrene are suitable nuclear-substituted styrenes.

Particularly preferred ratios by weight in the thermoplastic copolymer Bb are in the range of from 60 to 80% by weight of styrene and/or α-methylstyrene and from 40 to 20% by weight of acrylonitrile or methyl methacrylate.

The copolymers constituting component Bb are known and may be prepared by radical polymerisation, in particular by emulsion, suspension or solution polymerisation or solvent-free polymerisation. The copolymers constituting component Bb preferably have molecular weight Mw (weight average determined by light scattering or sedimentation) of from 15,000 to 200,000 and limiting viscosity numbers of from 20 to 110 ml/g (determined in dimethylformamide at 25° C.).

The grafted polyethers (II) according to the present invention are prepared by radical polymerisation of from 5 to 50% by weight, preferably from 10 to 30% by weight, of $C_1$–$C_6$-alkyl(meth)acrylates, cycloalkylacrylates or methacrylates and optionally styrene or α-methylstyrene in the presence of from 95–50% by weight, preferably from 90–70% by weight, of a polyalkylene ether.

Any commercially available radical starters may be used for the polymerisation, e.g. diacylperoxides, peresters, dialkylperoxides, hydroperoxides and aliphatic and araliphatic azo compounds. Preferred radical starters, e.g. azo isobutyronitrile, di-tert.-butylperoxide, tert.-butylperbenzoate, dicumylperoxide and 1,3-bis(t-ert.)-butyl-peroxyisopropyl)benzene start polymerisation sufficiently rapidly at temperatures of from 60° to 140° C. Dibenzoyl-peroxide is particularly preferred.

The polyalkylen ethers which are to be grafted according to this invention are synthesized from di- and polyfunctional (cyclo)aliphatic residues and may contain a small proportion of olefinic groups. Suitable examples include reaction products of diols or polyols, e.g. ethylene glycol, 1,2-propylene glycol, trimethylolpropane, glycerol, pentaerythritol, sorbitol and mannitol, and one or more alkylene oxides such as ethylene oxide and propylene oxide. (For preparation and use, see Ullmanns Encyklopädie der techischen Chemie, 4th Edition, Vol 19, page 31, Verlag Chemie, Weinheim 1980). Polyalkylene glycols containing high proportions of 1,2-propylene structures are preferred.

Both straight chained and branched polyalkylene glycols may be used, moderately branched types being preferred.

The polyalkylene glycols which are to be grafted according to the invention have molecular weights of from 500 to 15,000, preferably from 1000 to 10,000, most preferably from 2000 to 5000.

The $C_1$–$C_6$-alkyl(meth)acrylates and cycloalkylacrylates and methacrylates which are suitable monomers for the graft polymerisation may also contain functional groups, e.g. compounds such as 2-hydroxyethyl(meth)acrylate and 3-hydroxypropyl(meth)acrylate are suitable. Methyl methacrylate, ethylacrylate, butylacrylate, cyclohexylacrylate, benzylacrylate and 2-ethylhexylacrylate are preferred.

Styrene and α-methylstyrene may be used in addition to these acrylate monomers.

The polyalkylene ethers which have been modified by grafting are generally moderately to highly viscous, almost clear liquids or colourless suspensions.

The polyalkylene ethers grafted according to the invention are incorporated by known methods into the polymers which are to be treated antistatically, e.g. by kneading or rolling the components together or by extrusion. In addition to the antistatic agents according to this invention, conventional additives such as pigments, fillers, stabilizers, lubricants, mould release agents and the like may be added to the moulding compounds.

The moulding compounds prepared as described above are worked up into finished products such as housing parts for domestic and electrical appliances, profile sections, internal fittings for motor vehicles, foils etc. by conventional methods employed for thermoplasts, such as injection moulding.

The finished moulded products are distinguished by excellent antistatic properties and surfaces which are homogenous, glossy and free from deposits. The mechanical properties, such as dimensional stability under heat and impact strength, including impact strength at low temperatures, are virtually the same as in the unmodified material. In particular, the colour and thermostability of the polymer material are not adversely affected by the antistatic agents according to this invention.

EXAMPLES

Polymers for the preparation of polymer mixture I:
A) A Graft rubber prepared by emulsion polymerisation from 50% by weight of a polybutadiene stock having an average particle diameter ($d_{50}$) of 0.4 μm on which 36% by weight of styrene and 14% by weight of acrylonitrile have been grafted.
B) Styrene/acrylonitrile (SAN)=72:28-copolymer having a molecular weight Mw of about 80,000, with Mw/Mn−1≦2.
C) Aromatic polycarbonate of 2,2-bis-(4-hydroxyphenyl)-propane (bisphenol A) having a relative viscosity of 1.26 determined in $CH_2Cl_2$ at 25° C. (0.5% by weight solution).

Polyether II

General Method of Preparation:

A vinyl monomer or a mixture of several vinyl monomers is added dropwise to a polyether and dibenzoylperoxide (1% by weight) within 2 to 3 hours at 95°-100° C. with exclusion of air and the mixture is then completely polymerised at the same temperature in the course of 5 to 6 hours.

EXAMPLE 1

Polyether, prepared from 15 parts by weight of ethyl acrylate and 85 parts by weight of a polyhydroxypolalkylene glycol (OH number=28) prepared from trimethylolpropane, propylene oxide (87 parts) and ethylene oxide (13 parts).

EXAMPLE 2

Polyether prepared from 25 parts by weight of methyl methacrylate and 75 parts by weight of the polyalkylene glycol used in Example 1.

EXAMPLE 3

24 parts by weight of polymer A, 16 parts by weight of polymer B, 60 parts by weight of polymer C, 1 part by weight of pentaerylthritol stearate and 1.5 parts by weight of the polyether described in Example 1 were mixed together in an internal kneader at 200° C. The resulting material was granulated and worked up into sample bodies by injection moulding at 260° C.

The following data were obtained:
$a_k$ at room temperature according to DIN 53 453: 38.5 kJ/m²
Vicat B according to DIN 53 460: 115° C.
MFI 260/5 according to DIN 53 735: 15.4 g/10 min
Dust figures: no deposit

EXAMPLE 4

The polymer/lubricant mixture described in Example 3 was prepared, using 1.5 parts by weight of the polyether described in Example 2 as antistatic agent. The following data were obtained when the mixture was worked up in an analogous manner:
$a_k$ at room temperature according to DIN 53 453; 39.5 kJ/m²
Vicat B according to DIN 53460: 118° C.
MFI 260/5 according to DIN 53 735: 15.8 g/10 min
Dust figures: no deposit

EXAMPLE 5 For Comparison

The mixture of polymer and lubricant described in Example 3 was worked up as described there but without the addition of polyether. The following test data were obtained:
$a_k$ at room temperature according to DIN 53 453: 25.9 kJ/m²
Vicat B according to DIN 53 460 118° C.
MFI 260/5 according to DIN 53 735: 12.9 g/10 min
Dust figures: heavy deposit.

As may be seen from Examples 3 and 5, the addition of the polyethers according to this invention not only produces an excellent antistatic effect but also results in a marked increase in the noched impact strength and improved fluidity.

We claim:
1. Thermoplastic moulding compositions which comprise
I) 99.8 to 95% by weight of a polymer mixture which consists of
A) 95 to 10% by weight I) of at least one thermoplastic aromatic polycarbonate and
B) 5 to 90% by weight of I) of a mixture of
Ba) 20 to 100% by weight of one or more graft polymers of a mixture of 95-50% by weight of styrene with 5-50% by weight of acrylonitrile grafted onto polybutadiene and
Bb) 0-80% by weight of one or more thermoplastic vinylcopolymers of from 60 to 80% by weight of styrene or α-methylstyrene or both and from 40 to 20% by weight of acrylonitrile or methylmethacrylate, and
II) 0.2 to 5% by weight of a polyalkylene ether which has been grafted with a polymer of $C_1$-$C_6$-alkyl(meth)acrylates, cyclo-alkylacrylates or cycloalkylmethacrylates wherein the amount of grafted polymer in II) is 10 to 30% by weight and the amount of polyalkylene ether in II) is 90 to 70% by weight, and wherein the polyalkylene ether to be grafted has as molecular weight of from 500 to 15000.
2. The compositions of claim 1 which comprise 99 to 97% by weight of I) and 1 to 3% by weight of II).

* * * * *